United States Patent [19]
Kondo et al.

[11] Patent Number: 5,177,655
[45] Date of Patent: Jan. 5, 1993

[54] TAPE CASSETTE WITH GENERAL PURPOSE POLYSTYRENE BODY COLORED BY CONTROLLED AMOUNTS OF RUBBER COMPONENT AND PIGMENT

[75] Inventors: Shinichi Kondo; Naoki Yoshinari, both of Miyagi, Japan

[73] Assignee: Sony Corporation, Japan

[21] Appl. No.: 658,746

[22] Filed: Feb. 21, 1991

[30] Foreign Application Priority Data

Feb. 26, 1990 [JP] Japan .................. 2-045196

[51] Int. Cl.⁵ .......................................... G11B 23/087
[52] U.S. Cl. ................................................... 360/132
[58] Field of Search ................ 360/132; 242/199; 369/291

[56] References Cited

U.S. PATENT DOCUMENTS

| | | |
|---|---|---|
| 4,191,984 | 3/1980 | Tsukidate et al. ............... 242/199 |
| 4,530,475 | 7/1985 | Buerkle et al. .................. 360/132 |
| 4,965,690 | 10/1990 | Tanaka et al. .................. 360/132 |

Primary Examiner—Robert S. Tupper
Attorney, Agent, or Firm—Ronald P. Kananen

[57] ABSTRACT

A tape cassette is provided, in which a cassette shell body made of opaque resin and a window portion made of transparent resin are molded to be unitary by a dichromatic molding process. This tape cassette is characterized in that the transparent resin of the window portion is general purpose polystyrene and the opaque resin of the cassette shell body is general purpose polystyrene colored by adding thereto very small amounts of rubber component and pigment.

1 Claim, 2 Drawing Sheets

TAPE CASSETTE WITH GENERAL PURPOSE POLYSTYRENE BODY COLORED BY CONTROLLED AMOUNTS OF RUBBER COMPONENT AND PIGMENT

BACKGROUND OF THE INVENTION

1. Field of the Invention

The present invention generally relates to a tape cassette and, more particularly, is directed to a molding material of a cassette shell of a tape cassette.

2. Description of the Prior Art

FIG. 1 shows a plan view of an example of an arrangement of a cassette half or cassette shell in a conventional audio compact cassette.

In FIG. 1, a cassette shell, body 1 has a thick portion 2 which is shaped substantially as a trapezoid forming a front opening portion into which a magnetic transducer head (not shown) or the like is inserted, capstan insertion apertures 3a and 3b respectively, positioning apertures 4a and 4b respectively, a window portions which enables the user to visually confirm the state of a magnetic tape (not shown), and reel shaft insertion apertures 6a and 6b formed through the window portion 5, respectively.

In the thus arranged cassette shell, the cassette shell body 1 is made of an opaque resin of proper color and the window portion 5 is made of a transparent resin. Accordingly, the cassette shell body 1 and the window portion 5 are molded by a so-called dichromatic molding process in which the cassette shell body 1 is initially molded by an injection molding process, and then the window portion 5 is molded to be unitary with the cassette shell body 1 by an injection molding process.

In the conventional cassette shell molded by the dichromatic molding process, high impact polystyrene (HI-PS) is used as the opaque resin of the cassette shell body 1 and general purpose polystyrene (GP-PS) is used as the transparent resin of the window portion 5.

However, since high impact polystyrene utilized as the opaque resin of the conventional cassette shell body contains a high rubber component, such high impact polystyrene is low in rigidity as compared with general purpose polystyrene used as the transparent resin for the window portion. If the rigidity of the cassette shell is low as set forth above, then the cassette shell is easily affected by vibration when a magnetic tape is transported and a modulation noise of the magnetic tape is unavoidably increased. Further, the cassette shell made of high impact polystyrene is not uniformly glossy because of a relationship between the amount of rubber component and dispersion thereof, and it is therefore to be noted that the cassette shell body made of high impact polystyrene does not look excellent.

OBJECTS AND SUMMARY OF THE INVENTION

Accordingly, it is an object of the present invention to provide an improved tape cassette which can eliminate the aforenoted shortcomings and disadvantages encountered with the prior art.

More specifically, it is an object of the present invention to provide a tape cassette in which a modulation noise of a tape can be suppressed.

It is another object of the present invention to provide a tape cassette whose appearance is excellent.

It is still another object of the present invention to provide a tape cassette which can be made inexpensive.

It is a further object of the present invention to provide a tape cassette which can be produced more efficiently.

It is an additional object of the present invention to provide a tape cassette which can be applied to a wide variety of tape cassettes, such as an audio tape cassette, a video tape cassette and so on.

As an aspect of the present invention, a tape cassette is provided, in which a cassette shell body made of opaque resin and a window portion made of transparent resin are molded to be unitary by a dichromatic molding process. This tape cassette is characterized in that the transparent resin of the window portion is general purpose polystyrene and the opaque resin of the cassette shell body is general purpose polystyrene colored by adding thereto very small amounts of rubber component and pigment.

The above, and other objects, features and advantages of the present invention will become apparent in the following detailed description of an illustrative embodiment thereof to be made in conjunction with the accompanying drawing.

DETAILED DESCRIPTION OF THE PREFERRED EMBODIMENT

An embodiment of a tape cassette according to the present invention will be described hereinafter.

Fundamentally, the most specific feature of the present invention lies in that the cassette shell body 1 is made of general purpose polystyrene having high rigidity instead of conventional high impact polystyrene.

More specifically, the modulus of bending elasticity of high impact polystyrene used in the conventional cassette shell body 1 is in a range of from 23000 to 26000 kg/cm$^2$, while the modulus of bending elasticity of general purpose polystyrene used in the window portion 5 falls in a range of from 30000 to 33000 kg/cm$^2$. Accordingly, if the cassette shell body 1 is made of general purpose polystyrene similarly to the window portion 5, it becomes possible to increase the modulus of bending elasticity of the cassette shell body 1.

The cassette shell body 1 made of general purpose polystyrene can be made opaque and colored by adding a very small amount of rubber component and pigment. In that case, if the added amounts of rubber component and pigment are too small, the cassette, shell body 1 will not be colored sufficiently, while if the added amounts are too large, the rigidity of general purpose polystyrene will be decreased similarly to the high impact polystyrene. Therefore, the added rates or adding amounts of the rubber component and the pigment must be determined deliberately.

Having examined a wide variety of added amounts of the rubber component and the pigment relative to general purpose polystyrene, having made various kinds of test samples, and having measured data of test samples.

the assignee of the present application confirmed the following points. That is, if the added amount of rubber component relative to general purpose polystyrene is selected to be 0.11 to 0.22 weight percent and the added amount of pigment relative to general purpose polystyrene is selected to be 0.69 to 1.38 weight percent, then general purpose polystyrene can be colored by the same color as that of high impact polystyrene and also, sufficient rigidity can be secured. Since sufficient rigidity is obtained, the tape cassette can be substantially protected from being affected by vibration when a tape is transported, thus making it possible to improve tape modulation noise.

Figure 1:
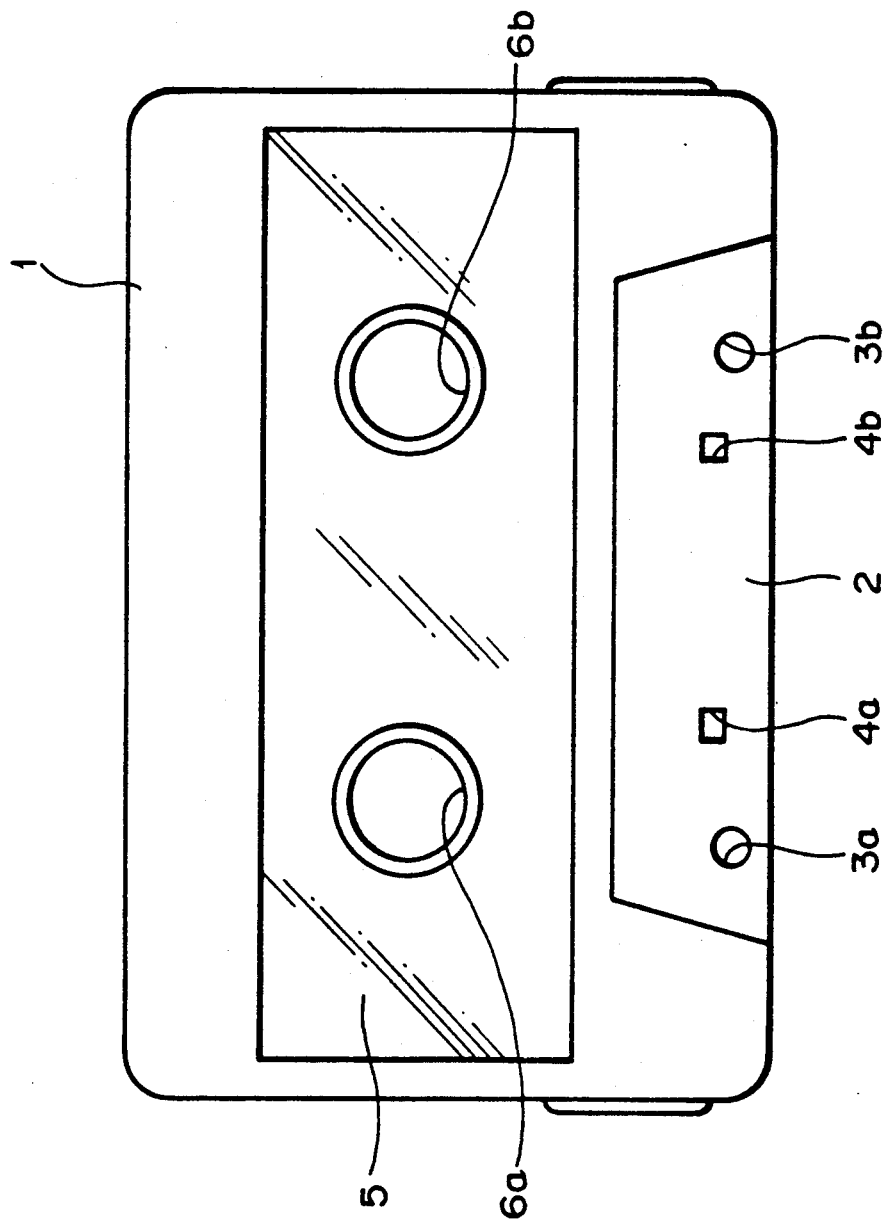
FIG. 1 is a plan view illustrating an example of a cassette shell of a conventional audio compact tape cassette.
Figure 2:
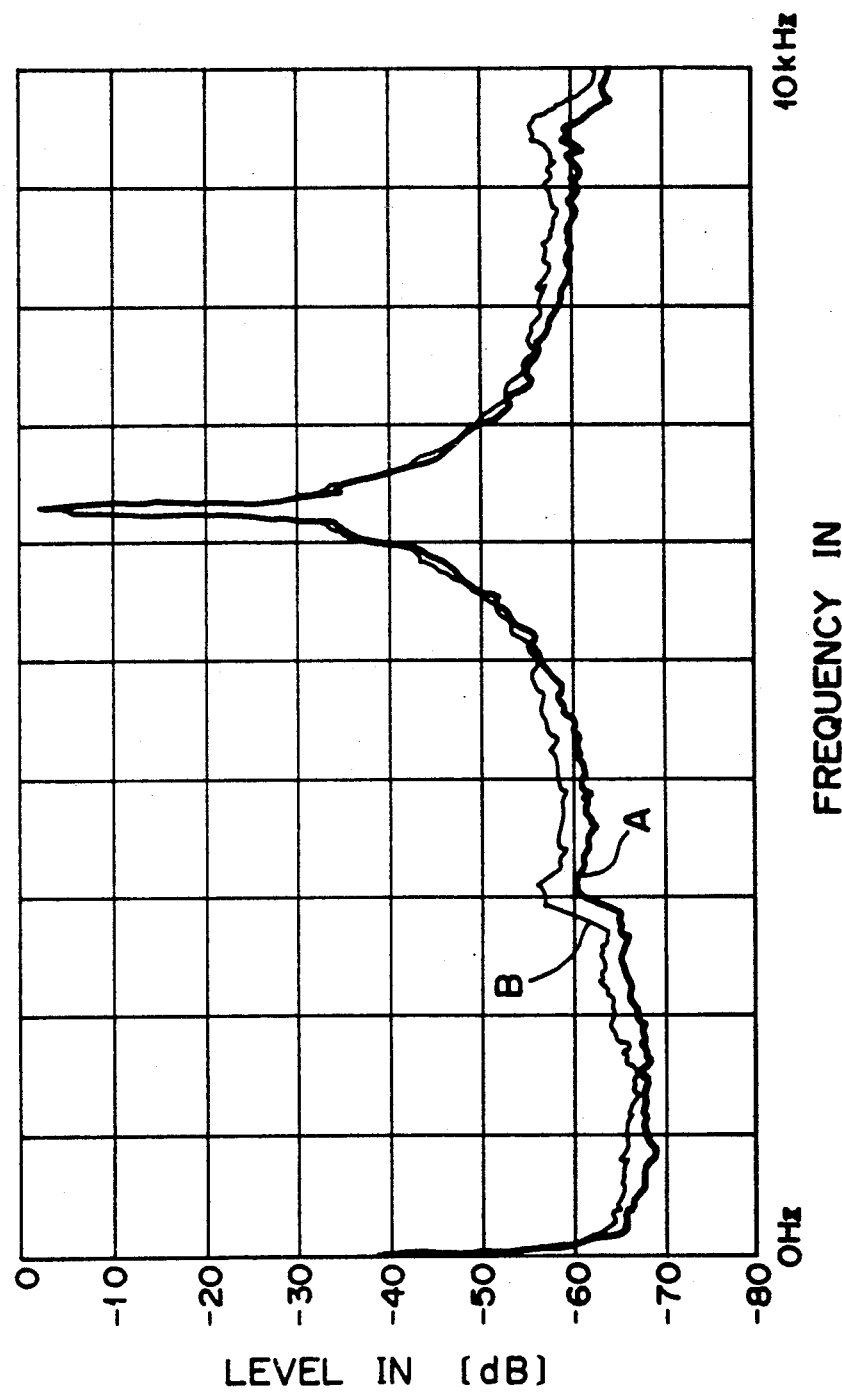
FIG. 2 is a graph of measured data of frequency versus noise level, and to which references will be made in understanding a tape modulation noise reducing effect achieved by an embodiment of a tape cassette according to the present invention.

FIG. 2 is a graph of measured results of frequency versus modulation noise level of the tape cassette of this embodiment in which the cassette shell body is molded by utilizing general purpose polystyrene into which the rubber component and the pigment are added with the above-mentioned adding ratios and the conventional tape cassette in which the cassette shell body is molded by utilizing high impact polystyrene. In the graph of FIG. 2, a bold line A represents the measured data of the tape cassette of this embodiment, and a thin line B represents the measured data of the conventional tape cassette, respectively. Incidentally, in the sample tape cassettes utilized in the measurement of modulation noise, only the material of the cassette shell body is different and the other mechanism assembly parts and tapes are the same.

As will be clear from the measured data of FIG. 2, according to the tape cassette of this embodiment in which the cassette shell body is molded by general purpose polystyrene in which very small amounts of rubber component and pigment are added, the modulation noise can be reduced substantially over the entire frequency range as compared with the conventional tape cassette in which the cassette shell body is molded by using high impact polystyrene. It is to be noted that modulation noise was improved by several decibel (dB) at maximum.

As described above, according to the tape cassette of this embodiment, since general purpose polystyrene is utilized as the material of the cassette shell body 1, rigidity thereof can be increased as at least sufficiently maintained because the adding amounts of rubber component and pigment are very small as compared with the conventional tape cassette in which the cassette shell body is made of high impact polystyrene and hence its tape modulation noise can be remarkably improved.

Further, gloss of general purpose polystyrene is high and the added amount of rubber component relative to general purpose polystyrene is very small so that the gloss of general purpose polystyrene can be prevented from being lost. Therefore, as compared with the conventional tape cassette, the gloss of the cassette shell body 1 of the present invention can be increased and made uniform; thereby, the appearance of the tape cassette of the present invention is improved.

In the dichromatic molding process, since the cassette shell body 1 and the window portion 5 are bonded together by means of general purpose polystyrene itself, it is possible to maintain sufficient bonding strength.

Furthermore, since general purpose polystyrene is inexpensive as compared with high impact polystyrene, the manufacturing cost of the tape cassette can be reduced by replacing conventional high impact polystyrene with general purpose polystyrene.

In addition, since a molding temperature of general purpose polystyrene is low as compared with that of high impact polystyrene, a cooling time of the molded cassette shell body can be reduced and therefore a molding cycle can be increased, which increases productivity.

Incidentally, it is needless to say that the present invention is not limited to the audio compact cassette and can be applied to a variety of various sorts of tape cassettes, such as an audio tape cassette, a video tape cassette and so on.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A tape cassette in which a cassette shell body made of opaque resin and a window portion made of transparent resin re molded to be unitary by a dichromatic molding process, characterized in that said transparent resin of said window portion is a general purpose polystyrene and said opaque resin of said cassette shell body is general purpose polystyrene colored by adding thereto amounts of rubber components and pigment, wherein said cassette shell body is made of general purpose polystyrene colored by adding thereto 0.11 to 0.22 weigh percent of rubber component and 0.69 to 1.38 weight percent of pigment.

* * * * *